(12) United States Patent
Hoysan et al.

(10) Patent No.: US 7,509,218 B2
(45) Date of Patent: Mar. 24, 2009

(54) PIN HEIGHT ADJUSTMENT IN BED OF NAILS SHAPE MEASUREMENT

(75) Inventors: Steven F Hoysan, Cypress, TX (US); Brian Paul Strines, Painted Post, NY (US)

(73) Assignee: Corning Incorporated, Corning, NY (US)

(*) Notice: Subject to any disclaimer, the term of this patent is extended or adjusted under 35 U.S.C. 154(b) by 90 days.

(21) Appl. No.: 11/602,730

(22) Filed: Nov. 21, 2006

(65) Prior Publication Data

US 2008/0120044 A1 May 22, 2008

(51) Int. Cl.
*G06F 19/00* (2006.01)

(52) U.S. Cl. ............................. 702/41; 702/166
(58) Field of Classification Search .............. 702/41, 702/166, 167
See application file for complete search history.

(56) References Cited

U.S. PATENT DOCUMENTS

| | | | | |
|---|---|---|---|---|
| 3,338,696 A | * | 8/1967 | Dockerty | 65/145 |
| 3,682,609 A | * | 8/1972 | Dockerty | 65/83 |
| 5,250,843 A | * | 10/1993 | Eichelberger | 257/692 |
| 5,635,848 A | * | 6/1997 | Hammond et al. | 324/758 |
| 5,909,124 A | * | 6/1999 | Madine et al. | 324/761 |
| 6,980,291 B2 | | 12/2005 | Saito | 356/237.2 |
| 6,985,231 B2 | | 1/2006 | Redner | 356/446 |
| 2003/0076487 A1 | | 4/2003 | Cannon et al. | 356/33 |

FOREIGN PATENT DOCUMENTS

| | | |
|---|---|---|
| EP | 0935120 A2 | 8/1999 |
| JP | 11201748 | 7/1999 |
| WO | WO02/03023 | 1/2002 |

OTHER PUBLICATIONS

Bushnell, M; Agrawal, V; "Essentials of Electronic Testing for Digital, Memory and Mixed-Signal VLSI Circuits"; Springer-Verlag; 2000; pp. 549-574.*

* cited by examiner

*Primary Examiner*—Edward R Cosimano
*Assistant Examiner*—Douglas N Washburn
(74) *Attorney, Agent, or Firm*—Bruce P. Watson; Gibson & Dernier, LLP

(57) ABSTRACT

Systems, methods, apparatus and products relate to systematic calculation and execution of pin height adjustments within a bed of nails shape measurement gauge with respect to a measured subject, such as glass substrates, and in particular, to using a bed of nails gauge for measuring a gravity-free shape of a surface of an object, including glass substrates used to make liquid crystal display (LCD) glass sheets. One or more embodiments may include a plurality of pins operable to support the surface during measurement. Each pin comprises a load cell operable to transmit measurement signals, and a height adjuster operable to receive adjustment signals and execute pin height adjustments upon receiving adjustment signals. Execution of the pin height adjustments systematically positions the pins so that the surface exerts on each pin a measured force nearing a target force corresponding to the gravity-free shape.

36 Claims, 4 Drawing Sheets

PIN HEIGHT ADJUSTMENT IN BED OF NAILS SHAPE MEASUREMENT

BACKGROUND

1. Field of Invention

The present invention relates to methods, systems, apparatus and products relating to calculation and execution of pin height adjustments within a bed of nails shape measurement gauge with respect to a measured subject substrate, such as glass substrates, and in particular, to using a bed of nails gauge for systematic shape measurement of glass substrates, such as liquid crystal display (LCD) glass sheets.

2. Description of Related Art

Producing flat product glass for displays, such as LCDs, involves many challenges. A key requirement in this process is the ability to minimize product distortion due to internal stresses in large product glass plates. Typical large product glass plates range in size up to 3.3 meters square.

Product distortion may be measured, for instance, using optical methods and gauging techniques, which have been developed over the past several years to enable distortion measurement via optical means. Distortion measurement may be done by comparing scribed reference marks on the product glass with scribed reference marks on a precision scribed glass master, before and after the glass shearing process. A measured difference between such scribe marks is relatable to a level of stress in the product glass.

As product glass sizes increase, measurement and control of the residual stress and shape deformation become more difficult. Nevertheless, larger glass product sizes are desired, and thus it is necessary to develop new products and methods that achieve larger-size product glass having residual stress and shape deformation within acceptable ranges.

SUMMARY OF THE INVENTION

In accordance with one or more embodiments of the present invention, systems, methods, apparatus and products relate to systematic calculation and execution of pin height adjustments within a bed of nails shape measurement gauge with respect to a measured subject substrate, such as glass substrates, and in particular, to using a bed of nails gauge for shape measurement of glass substrates, such as liquid crystal display (LCD) glass sheets.

According to one or more embodiments of the present invention, a method of measuring a gravity-free shape of a surface of an object may include receiving measurement signals from a load cell, systematically calculating pin height adjustments, and transmitting adjustment signals to a height adjuster; whereby execution of the pin height adjustments may position a plurality of pins so that the surface exerts on each pin a measured force nearing a target force corresponding to the gravity-free shape, and an array of pin height final values is indicative of a measurement of the gravity-free shape of the surface.

According to one or more embodiments of the present invention, an apparatus for measuring a gravity-free shape of a surface of an object may include a bed of nails shape measurement gauge having a plurality of pins operable to support the surface during measurement, and each pin may include a load cell and a height adjuster. Furthermore, the apparatus may include a processor operable to receive the measurement signals, to systematically calculate the pin height adjustments, and to transmit the adjustment signals to the height adjuster. The apparatus may calculate the pin height adjustments according to a pin height adjustment process in accordance with an embodiment of the present invention.

According to one or more embodiments of the present invention, a computerized system for measuring a gravity-free shape of a surface of an object may include computer executable instructions operable to cause a processor to receive measurement signals from a load cell, to systematically calculate pin height adjustments, and to transmit adjustment signals to a height adjuster. The system further may include a computer including the processor and a data storage medium. The computer executable instructions may include a measurement driver to communicate with the load cells; an adjustment driver to control the height adjusters; and a computational engine to perform calculations. The computer executable instructions further may include a database; an input/output driver; a logic interface; and a graphical user interface. The system may calculate the pin height adjustments according to a pin height adjustment process in accordance with an embodiment of the present invention.

According to one or more embodiments of the present invention, a method of systematic pin height adjustment within a bed of nails shape measurement gauge may include receiving measurement signals from a load cell; systematically calculating pin height adjustments; and transmitting adjustment signals to a height adjuster; whereby execution of the pin height adjustments positions a plurality of pins so that a surface exerts on each pin a measured force nearing a target force corresponding to a gravity-free shape.

According to one or more embodiments of the present invention, a product of the present invention may include a computer program product for systematic pin height adjustment within a bed of nails shape measurement gauge. The product may include computer executable instructions tangibly stored on a computer usable medium and operable to cause a processor to receive measurement signals from a load cell, to systematically calculate pin height adjustments for a pin comprising the load cell and a height adjuster operable execute pin height adjustments upon receiving adjustment signals, and to transmit adjustment signals to the height adjuster. The product may calculate the pin height adjustments according to a pin height adjustment process in accordance with an embodiment of the present invention.

In various embodiments of the present invention, the load cell and the height adjuster may comprise a pin; a plurality of pins may be operable to support the surface during measurement; a processor may be operable to receive the measurement signals, to systematically calculate the pin height adjustments, and to transmit the adjustment signals to the height adjuster; the load cell may be couplable to the processor via first circuitry and may be operable to transmit the measurement signals to the processor; and the height adjuster may be couplable to the processor via second circuitry and may be operable to receive the adjustment signals from the processor.

Also in various embodiments of the present invention, systematically calculating pin height adjustments may include actions associated with a pin height adjustment process that may include calculating a target force on each pin; determining an array $\{F_t\}$ of target forces on the pins; calculating a matrix, $[K]$, of force changes relative to height changes, and inverse matrix, $[K]^{-1}$; beginning an $F_m$-cycle by receiving measurement signals representing a measured force on each pin; determining an array $\{F_m\}$ of measured forces on the pins; calculating a force difference array, $\{\Delta F\}$, from the array of measured forces and the array of target forces; determining whether the force difference array, $\{\Delta F\}$, is within a range of acceptable differences; if yes, exiting the $F_m$-cycle and the pin height adjustment process, with the array {H} of pin height final values; if no, then continuing the current $F_m$-cycle by calculating a pin height adjustment for each pin; transmitting the pin height adjustments as adjustment signals; and beginning a new $F_m$-cycle.

In various other embodiments of the present invention, a pin height adjustment process alternatively may include the actions of: calculating a target force on each pin; determining an array {$F_t$} of target forces on the pins; beginning a loop of CG-cycles, a CG-cycle including beginning a loop of CG-sub-cycles, a CG-sub-cycle including transmitting a first pin height adjustment as a first adjustment signal to change a height of a first pin j; receiving a measured force as a measurement signal for each pin; calculating a load change for each pin; calculating a conjugate gradient $CG_{ij}$ of each pin i with respect to the first pin height adjustment to pin j; if not all pins have been selected, adding one to j, e.g., j=j+1, so as to select a second pin j, and beginning a new CG-sub-cycle in the loop of CG-sub-cycles; if all pins have been selected, such that a $CG_{ij}$ has been calculated for each pin, determining a matrix [CG] of conjugate gradients; calculating a conjugate gradient matrix inverse $[CG]^{-1}$ to exit the loop of CG-sub-cycles; beginning a loop of $F_m$-cycles, an $F_m$-cycle including receiving measurement signals representing a measured force on each pin; determining an array {$F_m$} of measured forces on the pins; calculating a force difference array, {$\Delta F$}, from the array of measured forces and the array of target forces; assigning a variable {$\Delta F$} (previous) values of the force difference array for a previous $F_m$-cycle; assigning a variable {$\Delta F$}(current) values of the force difference array, {$\Delta F$}, for a current $F_m$-cycle; determining whether the force difference array, {$\Delta F$}, is within a range of acceptable differences; if yes, exiting the current $F_m$-cycle, exiting the CG-cycle, and exiting the pin height adjustment process, with the array {H} of pin height final values; if no, continuing the current $F_m$-cycle by calculating a pin height adjustment for each pin; transmitting the pin height adjustments as adjustment signals; determining whether the force difference array of the current $F_m$-cycle, {$\Delta F$} (current), is less than the force difference of the previous $F_m$-cycle, {$\Delta F$} (previous); if yes, beginning a new $F_m$-cycle while continuing in the current CG-cycle, using the current [CG]; if no, exiting the current $F_m$-cycle, and beginning a new CG-cycle.

The advantages of this invention are best understood after reading the detailed technical description, and in relation to existing glass quality control processes. Nonetheless, some of the advantages are highlighted below.

Among other advantages, a gravity-free shape of a surface may be determined systematically. The determination of the gravity-free shape may be accelerated and automated. Multiple pin height adjustments are made simultaneously, rather than one at a time. Moreover, the accuracy and likelihood of the determination of the gravity-free shape increase. The increased efficiency and effectiveness reduce time consumption and costs associated with gravity-free shape determination.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, wherein like numerals indicate like elements, there are shown in the drawings simplified forms that may be employed, it being understood, however, that the invention is not limited by or to the precise arrangements and instrumentalities shown, but rather only by the issued claims. The drawings may not be to scale, and the aspects of the drawings may not be to scale relative to each other.

DETAILED DESCRIPTION OF THE PRESENT INVENTION

Figure 1:
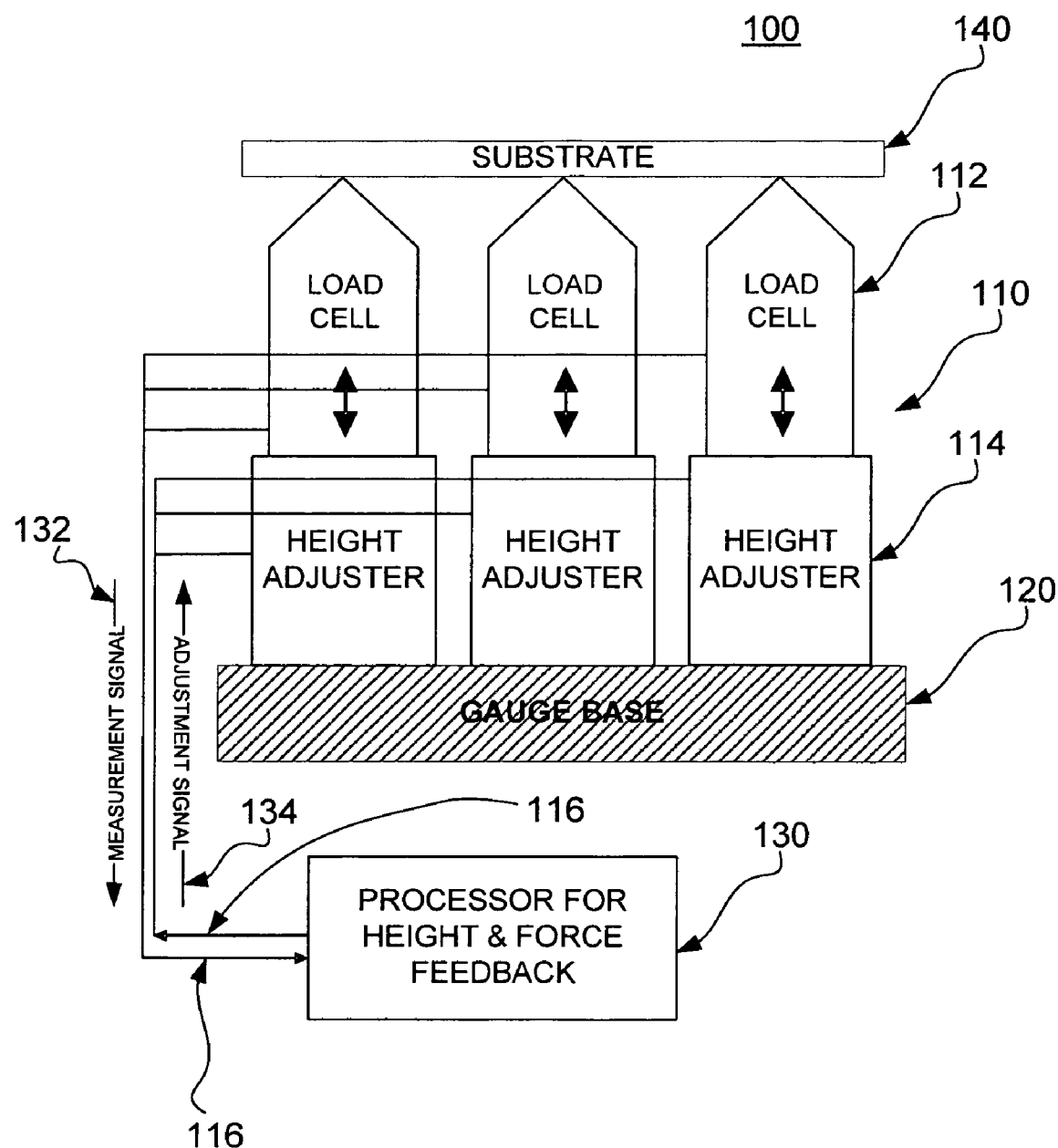
FIG. 1 is a block diagram illustrating an exemplary bed of nails shape measurement gauge in accordance with one or more embodiments of the present invention.

The present invention relates to methods, systems, apparatus and products related to calculation and execution of pin height adjustments within a bed of nails shape measurement gauge with respect to a measured subject substrate, such as glass substrates made in a fusion draw machine (FDM). In particular, the present invention relates to using a bed of nails gauge for shape measurement of glass substrates, such as liquid crystal display (LCD) glass sheets.

Corning Incorporated has developed a process known as the fusion process (e.g., downdraw process) to form high quality thin glass sheets that can be used in a variety of devices like flat panel displays. The fusion process is the preferred technique for producing glass sheets used in flat panel displays because the glass sheets produced by this process have surfaces with superior flatness and smoothness when compared to glass sheets produced by other methods. The general fusion process is described in numerous publications, such as U.S. Pat. Nos. 3,338,696 and 3,682,609, and is well-known in the art.

One embodiment of the fusion process involves using a fusion draw machine (FDM) to form a glass sheet and then draw the glass sheet between two rolls to stretch the glass sheet to a desired thickness. A traveling anvil machine (TAM) is used to cut the glass sheet into smaller glass sheets that are sent to customers.

By way of example, the product glass may comprise CORNING INCORPORATED GLASS COMPOSITION NO. 1737 or CORNING INCORPORATED GLASS COMPOSITION NO. EAGLE$^{2000\text{TM}}$. These glass materials have numerous uses, in particular, for example, the production of liquid crystal displays.

It has been found that the movement of the glass sheet between the FDM and TAM is a cause of stress (warp) in the glass sheet. It has also been found that the glass sheet is further stressed because it moves when it is cut by the TAM. There are several problems that can occur whenever the glass sheet is stressed. For example, a stressed glass sheet can distort more than 2 microns which is not a desirable situation for the customers. As another example, a large glass sheet may be stressed yet undistorted but then distort when it is cut into smaller glass sheets.

In the fusion drawing technology, the isopipe delivers a large, thin, viscous sheet of glass melt. As the viscous sheet cools down, a large thin glass ribbon is first formed at the setting temperature. The continuous cooling of the ribbon results in a temperature gradient on the ribbon. Furthermore, the bead thickness along either edge of the glass sheet is much larger than the thickness of the central quality area of the glass sheet. The bead cooling rate is different from that in the quality area. There are therefore both down-the-draw and across-the-draw temperature variations. The temperature variations cause thermal mechanical stress. The ribbon has a typical width of the order of 2 meters and a length varying from 2 to 6 meters. The thickness of the ribbon is 0.7 mm or less.

With such a thin large ribbon, a very small in-plane compressive stress leads to the ribbon buckling. If the compressive stress is much larger than the critical buckling stress, multimode instability may be triggered. When using an FDM, the ribbon cooling may generate a compressive stress of the order of several hundred psi, which is much larger than the critical buckling stress. Such large thermal stress may cause out-of-plane deformation, multimode of buckling, bow pop-ups.

In downflow drawing, and resulting fusion, of liquid crystal display (LCD) glass sheet, it is of critical importance that a manufacturer achieve stable production of LCD glass sheet with minimal residual stress and shape deformation at high flow density and large ribbon size. To reduce LCD panel manufacturing costs, panel makers are requiring larger and larger glass sheets, such as Gen 7, Gen 8 and beyond. As the sheet size increases for the future generations, the requirements for sheet shape and distortion control become more stringent.

There are a number of factors that contribute to residual stress and shape distortion, such as thermo-mechanical stress, bow pop-ups, ribbon buckling, sheet motion, pulling force, gravity, TAM application, and ribbon cutting dynamics. Because the glass ribbon is large and thin, a very small compressive stress may cause the ribbon to buckle. The buckling causes instability, and jumps of buckling modes or bow pop-ups result in high levels of stress and shape deformation.

While several advanced technologies have been developed to minimize the stress and shape deformation, the corollary to controlling stress and shape deformation is the measurement of shape deformation, which provides an indication of internal stress. Most prior art technologies for measurement of shape deformations involve optical methods and apparatus for imaging the surface of the measured subject. An example of such an optical device would include an optical distortion gauge, discussed above. Optical technologies have the advantage that the measured subject, such as a glass substrate, makes minimal contact with the gauge, which reduces the potential for damaging the glass substrate in the measurement process. However, the optical methods generally do not measure the substrate in a "gravity-free" context, and hence the gravity-free shape of the substrate is not measured.

In contrast, the present invention uses a bed-of-nails (BoN) gauge to measure the gravity-free shape of flexible plate-like objects. An exemplary flexible plate-like object is a glass substrate made from the fusion draw process. Before these sheets are used to manufacture LCD panels, they need to meet quality control guidelines, which include minimal shape distortion. Basically, the substrate is supported on a bed of nails, usually referred to separately as pins; the pins are capable of vertical movement and can also measure the supported force from the substrate.

The heights of the pins are adjusted until each pin supports a specified target weight. For instance, a target weight for an even and flat substrate resting on equally distributed pins might be an equal fraction of the entire weight of the substrate. However, each target weight likely will be different from the next, and the target weights may be determined using a stress analysis based on finite element analysis. When all the pins are at their specified weight, they are supporting the particular substrate in its gravity-free shape. With the array of pins at their gravity-free positions, the gravity-free shape may be measured by optical means that scan the substrate surface and measure the heights over the entire surface, at and between the pins.

A problem with a BoN gauge is that changing the height of a single pin potentially changes the weight on all the other pins. For instance, in the extreme example of a single pin being raised high enough to raise the substrate above the tops of assorted pins, the assorted pins would no longer bear any weight, as they do not contact the substrate. Therefore, if the height on one pin is adjusted so that the target weight is supported momentarily, the amount of weight supported will be changed when the height on another pin is changed. If the system is adjusted manually, it will take a tremendous amount of time to adjust the pins. If the system is automated, an algorithm is needed to adjust the pins.

In a former system that is adjusted manually, each pin is adjusted separately. Each pin height is adjusted until the target weight is achieved. This single adjustment action is done one pin at a time, from the first pin to the last pin. However, since adjusting one pin changes the load on all the others, this procedure must be repeated time and time again, each cycle correcting for minor deviations introduced in the previous cycle.

In accordance with one or more embodiments, the present invention includes methods for adjusting the pin heights to simultaneously support the target weights for all pins. In particular, the present invention provides for systematic calculation and execution of appropriate pin height adjustments for the array of pins. When all the pins are at their specified weight, their heights are at the gravity-free height for that particular substrate. The array of pins at their gravity-free heights provides a measurement of the gravity-free shape, and potential shape distortion, if any. Height adjusters of the pins also track the heights of the pins, obviating the need for additional height measurement means, such as an optical scanner.

Pursuant to the present invention, however, all pins may be adjusted at the same time. No evaluation of the pin force is necessary until all the pins are adjusted. The pin force is the upward force of the pin, which equals the downward force supported by the pin, if the pin is not in motion. By adjusting the pins as a group, the process accounts for the fact that adjusting one pin affects all the other pins. As a result, the present invention may have the advantage of achieving the target pin force on all the pins in almost every case.

Referring to FIG. 1, a block diagram illustrates an exemplary bed of nails shape measurement gauge 100 in accordance with one or more embodiments of the present invention. The BoN gauge 100 may include a plurality of pins 110, having at least three pins 110, a gauge base 120, and a processor 130. A flexible plate-like object serves as the measurement subject 140, which here is depicted as glass substrate 140. The substrate 140 rests on top of the plurality of pins 110, and as the measurement subject 140 flexes under gravity, each pin 110 bears a specific weight. Each pin 110 includes a load cell 112 to measure the specific weight supported by the pin 110. The load cell 112 may be mounted on top of a height adjuster 114, which is a device, likely motorized, that adjusts the height of the pin 110 in a known manner. Other arrangements are conceivable, such as having the load cell 112 underneath, and accounting for the weight of the height adjuster 114.

Each load cell 112 may transmit to processor 130 via circuitry 116 measurement signals 132 relating to the measured pin force, and the processor 130 then may perform an algorithm to calculate the necessary height adjustments for each pin 110. The processor 130 may transmit adjustment signals 134 to each height adjuster 114 via circuitry 116 to execute the calculated height adjustments. As is often the case, the better the algorithm, the sooner the load cells 112 will read the target load.

The present invention takes advantage of the fact that changing the pin height of a single pin 110 typically changes the load on all the pins 110. Say there are N pins 110 used in the gauge 100. The object is to find the pin heights such that the forces on each pin 110 are at a specific value. For instance, for a substantially planar substrate 140 of relatively even thickness and density, an approximately equal distribution of mass may be assumed so that the specific weight value may equal 1/N of the substrate weight, given an equal distribution of the N pins 110.

According to an embodiment of the present invention, three of the pins 110 will not be adjusted and hence they are stationary for each adjustment cycle. The three stationary pins 110 fix a reference plane, for which reason these pins 110 should not lie on a line. For each cycle, three pins will remain fixed. These may be adjusted in subsequent cycles. Thereafter, all remaining N−3 pins 110 may be adjusted as calculated below to also support the specific weight.

Calculating the pin height adjustments for the remaining N−3 pins 110 can be considered a set of simultaneous equations, with N−3 equations and N−3 unknowns which relate the change in pin heights to the change in pin weights. The three pins are fixed to define a reference plane with respect to which the equations relate. From a physics perspective, the sum of forces, sum of moments about one axis, and sum of moments about another axis represent three equations that must be satisfied. By fixing these three pins, these pins systematically will have their targeted weight satisfied by adjusting the others, which will have their target weight satisfied as well. From a geometry perspective, without fixing three points, rigid motion would be possible, though undesirable. Rigid motion could translate the substrate and rotate it about two different axes, which would yield more than one solution to the pin height adjustment set of equations. Thus, three points are fixed, so that there is only one solution to the pin height adjustments set of equations. However, the equations are not necessarily known. This invention presents a means of solving these equations without actually knowing them.

Figure 2:
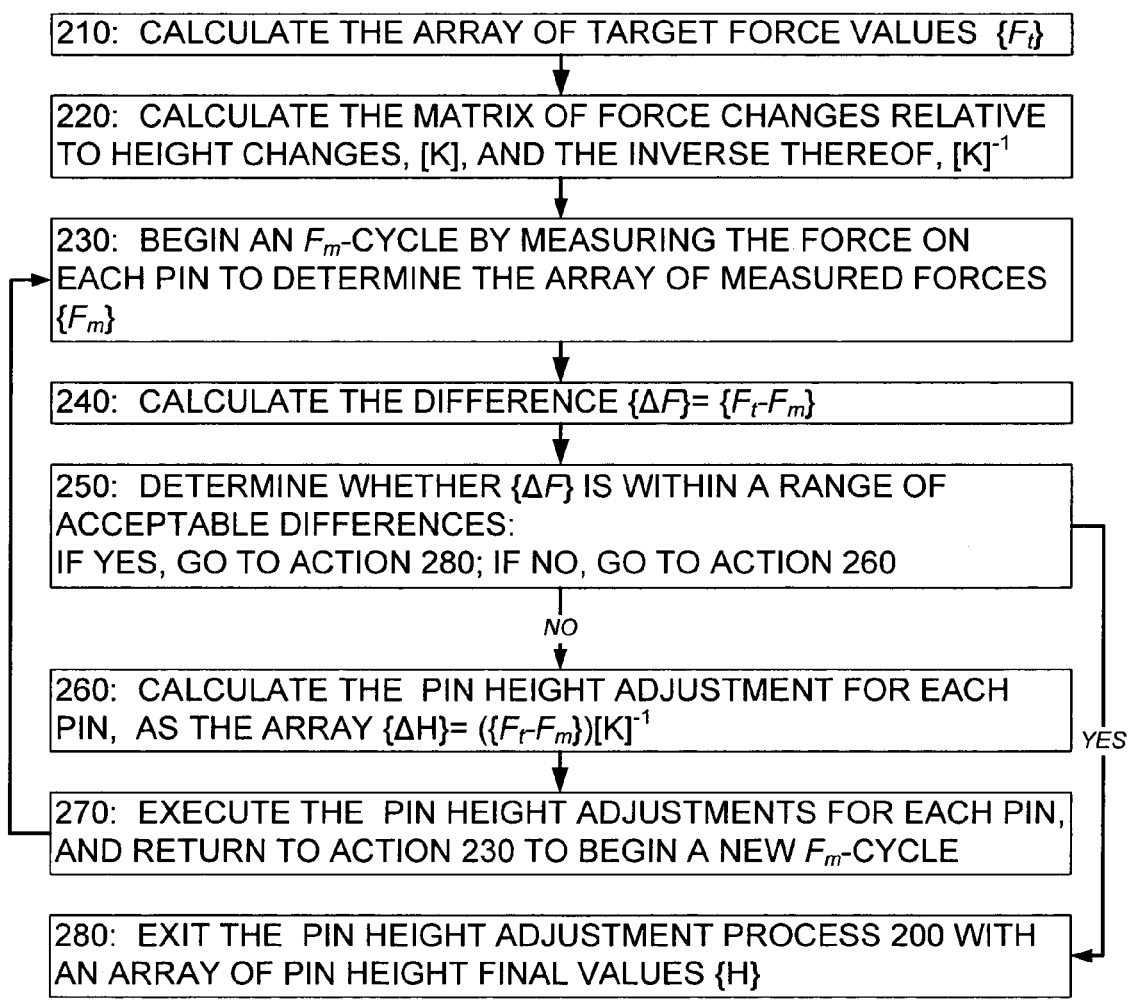
FIG. 2 is a flow diagram illustrating exemplary process actions that may be carried out to calculate and execute pin height adjustments in accordance with one or more embodiments of the present invention.

Referring to FIG. 2, a flow diagram illustrates process actions that may be carried out to calculate and execute pin height adjustments within a bed of nails shape measurement gauge 100 with respect to a measured subject 140 in accordance with one or more embodiments of the present invention. An exemplary adjustment process 200 may include some or all of the enumerated actions.

In process 200, the primary assumption is to approximate the shaped substrate 140 as being flat. Assuming only small deflections, linear elastic plate theory and a finite element model of the system may be used to calculate the change in load on every load cell 112 with a unit change in height of one of the pins 110, having all the other pins 110 held fixed. This can be done for every support pin 110, one pin 110 at a time. Since small deflection is assumed, linear elastic plate theory super-positioning is assumed to be valid. That is, the change in load on all those pins 110 may be calculated if all N−3 pins 110 are moved different amounts. The load change on pin i can be expressed by Equation 1:

$$\Delta F_i = \Sigma_{j=1}^{j=N} k_{ij} \Delta H_j \qquad \text{Equation 1}$$

where $\Delta F_i$ is the change of force on pin i; $k_{ij}$ is the change of force on pin i for a unit change of height on pin j; and $\Delta H_j$ is the change of height on pin j. In matrix form, the following equation of expressions, Equation 2, may be derived:

$$\{\Delta F\} = [K]\{\Delta H\} \qquad \text{Equation 2}$$

As mentioned above, $k_{ij}$ can be calculated from finite element analyses for a flat plate. After calculating the [K] components, the processor 130 may derive the support pin height adjustments. After the substrate 140 is placed on the gauge 100, the processor 130 reads the force on all the pins 110 from the corresponding load cell 112. The processor 130 may compare these force measurements to the specific values of target force, the difference of which is $\{\Delta F\}$, using Equation 3, below.

$$\{\Delta F\} = \{F_t - F_m\} \qquad \text{Equation 3}$$

where $F_t$ is an array containing the target force value on each of the N−3 pins 110; and $F_m$ is an array containing the measured force value of each of the N−3 pins 110. By inverting [K], the processor 130 may solve for $\{\Delta H\}$. Equation 4, below, summarizes the calculation:

$$\{\Delta H\} = [K]^{-1}(\{F_t - F_m\}) \qquad \text{Equation 4}$$

If the measurement values are not within an acceptable range of error of the target force on the first cycle of pin height adjustments, the cycle of pin height adjustments may be repeated until the target values are obtained, within the acceptable margin of error.

The following actions outline process 200:

In action 210 of process 200, calculate the array of the target forces on each of the N−3 pins 110, $\{F_t\}$.

In action 220 of process 200, using Equations 1 and 2, for example, calculate the matrix of force changes relative to height changes, [K], the inverse thereof, $[K]^{-1}$.

In action 230, begin an $F_m$-cycle by measuring the force on each pin 110 to determine the array of the measured forces on each of the N−3 pins 110, $\{F_m\}$.

In action 240, calculate the difference between the measured and target pin forces, using Equation 3, for example.

In action 250, determine whether the force difference, $\{\Delta F\}$, is within a range of acceptable differences. If yes, then go to action 280 to exit the $F_m$-cycle. If no, then go to action 260 to continue the current $F_m$-cycle.

In action 260, calculate the pin height adjustment for each pin 110, using Equation 4, for example.

In action 270, execute the pin height adjustments and return to action 230 to begin a new $F_m$-cycle.

In action 280, exit the pin height adjustment process 200, having an array of pin height final values, {H}, indicative of the shape of the measured surface of substrate 140.

Figure 3:
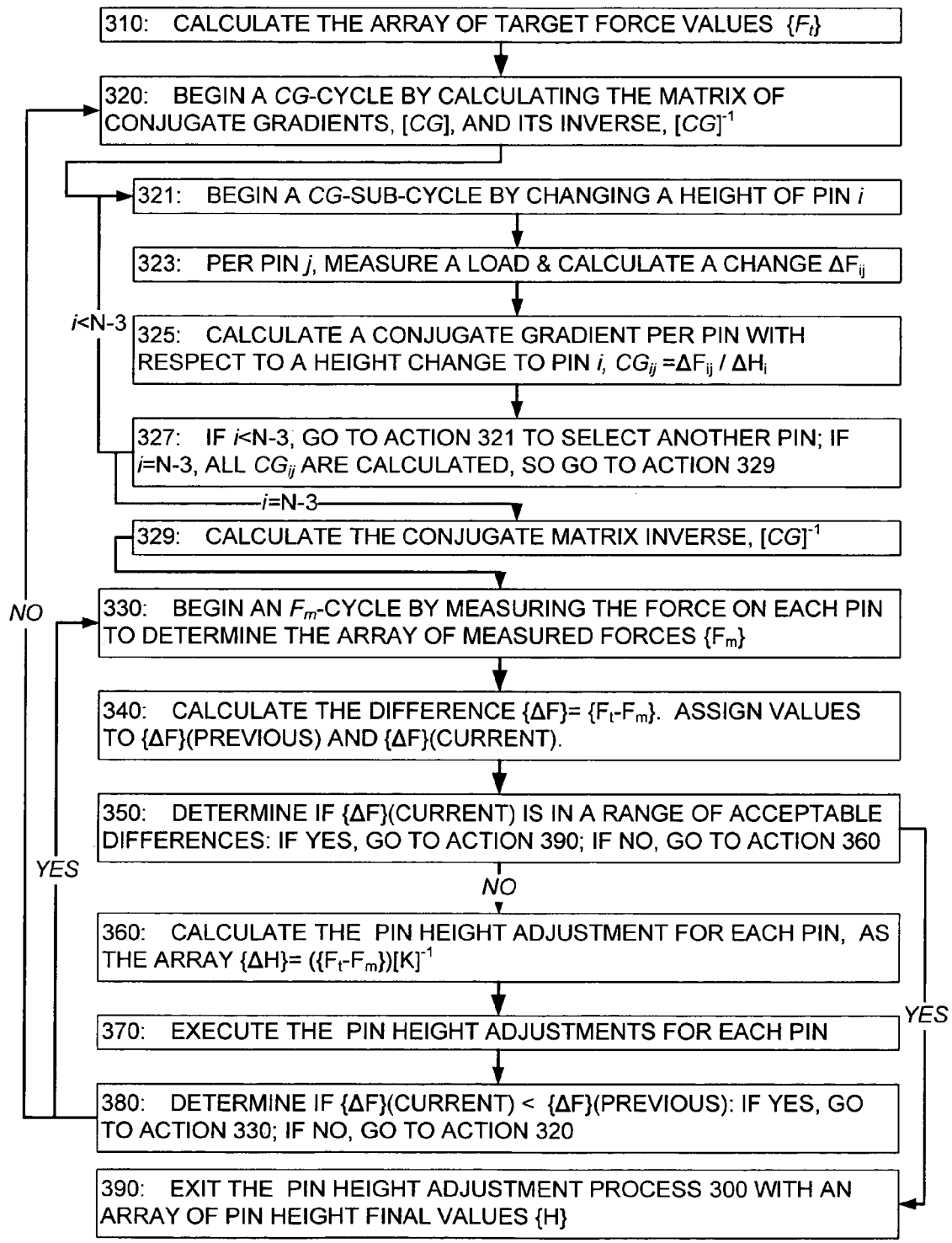
FIG. 3 is a flow diagram illustrating further exemplary process actions that may be carried out to calculate and execute pin height adjustments in accordance with one or more embodiments of the present invention.

Referring to FIG. 3, a flow diagram illustrates process actions that may be carried out to systematically calculate and execute pin height adjustments within a bed of nails shape measurement gauge 100 with respect to a measured subject 140 in accordance with one or more embodiments of the present invention. An exemplary adjustment process 300 may include some or all of the following actions.

As mentioned above, the task may be characterized as a set of N−3 simultaneous equations with N−3 unknowns. In contrast to process 200, however, the assumption of linear plate theory may not be valid with large deflections. Whereas finite element analysis (FEA) may be used to calculate the [K]

matrix for a flat substrate 140, the same matrix may not be accurate, however, for non-flat substrates.

In process 300, the primary assumption is to approximate the shaped substrate 140 as being non-flat. Process 300 may use a conjugate gradient analysis to solve the system of non-linear simultaneous equations. Similar to process 200, process 300 may use equations analogous to Equations 1-4, as modified below. For instance, Equation 5 may be used to solve for the pin support height change.

$$\{\Delta H\} = [CG]^{-1}(\{F_t - F_m\}) \quad \text{Equation 5}$$

where [CG] is a matrix containing the conjugate gradient for each of the N−3 support pins 110.

The conjugate gradient, $CG_{ij}$, is the derivative of: the force on pin i with respect to the height of pin j. For systems of complicated non-linear simultaneous equations, deriving the gradient is not convenient, but may be done computationally, wherein a slight change is made to one variable and the response is calculated. The gradient is the change in response divided by the change in the variable, such as in Equation 6 below.

$$CG_{ij} = \Delta F_i / \Delta H_j \quad \text{Equation 6}$$

This change/measurement/calculation combination is done for all the variables, i,j=1 to N−3, to calculate the matrix [CG].

In process 300, the processor 130 may adjust the height on one pin 110, pin j, and calculate the change in load on all N−3 pins 110, based on measured force values before and after the height adjustment of pin j. As in Equation 6 above, dividing the change in load on pin (i) by the change in height of pin (j) will yield $CG_{ij}$. Performing such a conjugate gradient analysis for all the N−3 pins 110 will allow us to calculate [CG]. Once [CG] is obtained, $[CG]^{-1}$ may be determined and the processor 130 may calculate $\{\Delta H\}$, using, for example, Equation 5, shown above, and execute the pin height adjustments accordingly.

Insofar as calculating the conjugate gradient may be time consuming, and possibly not necessary every cycle, the same [CG] matrix may be used for several cycles. Generally speaking, a given [CG] matrix may be used until the processor 130 determines that further pin height adjustments, based on the given [CG], no longer are causing the measured force values to converge on the target values, at which point a new [CG] may be calculated.

The following actions outline process 300:

In action 310 of process 300, calculate the array of the target forces on each of the N−3 pins 110, $\{F_t\}$.

In action 320, begin a CG-cycle by calculating the matrix of conjugate gradients, [CG], and the inverse thereof, $[CG]^{-1}$, using actions 321 to 329, for example.

In action 321, begin a CG-sub-cycle by changing the height of one pin 110, i.e., pin j.

In action 323, measure the load on, and calculate the load change for, all the pins 110, i.e., for pin i, where i=1 to N−3.

In action 325, calculate the conjugate gradient $CG_{ij}$ of each pin 110, pin i, with respect to a pin height adjustment to pin j, using Equation 6, for instance.

In action 327, if j<N−3, go to action 321 to begin a new CG-sub-cycle, select a different pin 110, such as by adding one to the value of j, e.g., j=j+1, and change the height of the different pin 110, pin j. CG-sub-cycles should continue until j=N−3. When all the pins 110, j=1 to N−3, have been selected, such that all components $CG_{ij}$ of [CG] are calculated, go to action 329.

In action 329, calculate the inverse, i.e., $[CG]^{-1}$, of the conjugate gradient matrix [CG].

In action 330, begin an $F_m$-cycle by measuring the force on each pin 110 to determine the array of the measured forces on each of the N−3 pins 110, $\{F_m\}$.

In action 340, calculate the difference, $\{\Delta F\}$, between the measured and target pin forces, using Equation 3, for example. Assign the variable $\{\Delta F\}$ (previous) the value of the difference for the previous $F_m$-cycle, and assign the variable $\{\Delta F\}$(current) the value of the difference for the current $F_m$-cycle, e.g., $\{\Delta F\}$.

In action 350, determine whether the force difference, $\{\Delta F\}$(current), is within a range of acceptable differences. If yes, then go to action 390 to exit the loop of $F_m$-cycles. If no, then go to action 360 to continue the current $F_m$-cycle.

In action 360, calculate the pin height adjustment for each pin 110, using Equation 5, for example.

In action 370, execute the pin height adjustments.

In action 380, determine whether the force difference of the current $F_m$-cycle, $\{\Delta F\}$ (current), is less than the force difference of the previous $F_m$-cycle, $\{\Delta F\}$ (previous). If yes, then go to action 330 to begin a new $F_m$-cycle while continuing in the current CG-cycle, using the current [CG], because the current [CG] continues to cause the measured force values to converge to the target force values. If no, then go to action 320 to calculate a new [CG] and begin a new CG-cycle.

In action 390, exit the pin height adjustment process with an array of pin height final values, {H}, indicative of the shape of the measured surface of substrate 140.

Figure 4:
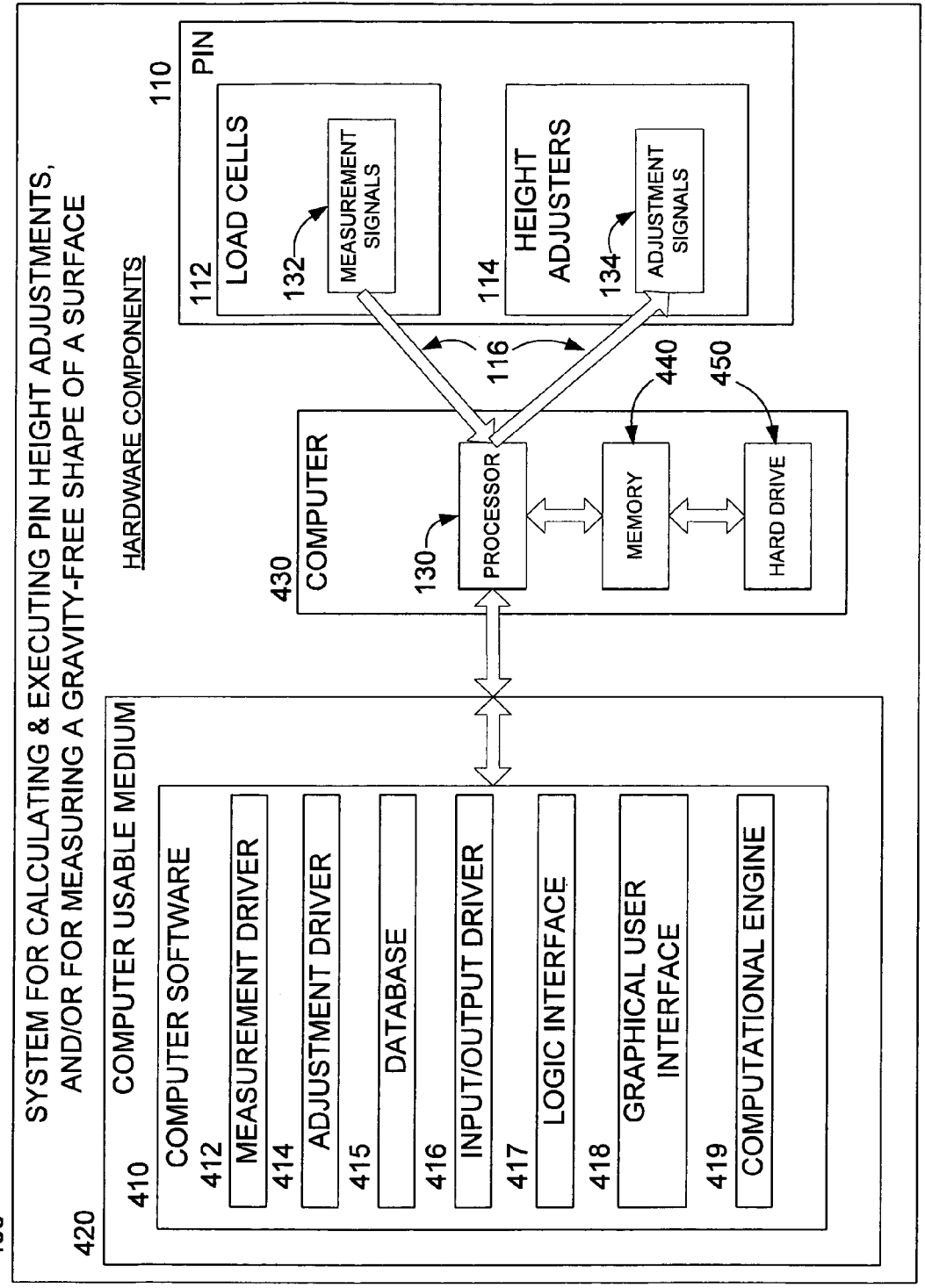
FIG. 4 is a block diagram illustrating a system related to calculation and execution of pin height adjustments in accordance with one or more embodiments of the present invention.

Referring to FIG. 4, a block diagram illustrates a system 400 in accordance with one or more embodiments of the present invention. System 400 is a system for, on the one hand, calculating and executing pin height adjustments in a bed of nails shape measurement gauge 100, and on the other hand, measuring a gravity-free shape of a surface of an object. System 400 may include computer software 410, which may be a computer program product tangibly stored on computer usable medium 420. Computer usable medium 420 may include numerous varieties of tangible data storage technologies, such as optical discs, magnetically programmed media, semiconductor memory (e.g., flash memory), magneto-optical memory, punch cards, holographic memory, molecular memory, phase-change memory, etc. Software 410 comprises computer executable instructions operable to control a processor 130, such as in computer 430. In addition, the system 400 may include one or more hardware components, such as the processor 130, the computer 430, the pins 110, the load cells 112, the height adjusters 114, and circuitry 116 connecting the processor 130 with load cells 112 and the height adjusters 114. For instance, the load cells 112 and height adjusters 114 could be connected to the computer 430. In other embodiments, the processor 130 may store the software 410 on a data storage medium, such as directly in memory 440 or indirectly on a hard drive 450, inside or outside the computer 430.

Insofar as all computational and signal-related aspects of the present invention may be performed by a conventional computer 430 or computer system having appropriate software 410, the various data points, such as the assumptions, measured force values, target force values, pin height adjustments, etc., may be entered and tracked with the software 410. The software 410 may include software components such as measurement driver 412 to communicate with the load cells 112; an adjustment driver 414 to control the height adjusters 114; a database 415 for data storage; an input/output driver 416 to interact with the circuitry 116; a logic interface 417 to store logic, rules and conditions; a graphical user interface 418 for interaction with a computer operator; and a computational engine 419 that performs the necessary calculations using the processor 130 of the computer 430. Via the interaction with the computer 430, the software 410 could be designed to automatically instruct the computer 430 to receive and process the measurement signals 132 from the load cells 112, perform the calculations (e.g., of processes 200 and 300), and transmit the adjustment signals 134 to the height adjusters 114. In conjunction with all the hardware components, the system 400 could be configured to automate process 200 and/or process 300.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
    (a) receiving measured forces $\{F_m\}$, each measured force $F_m$ indicative of a force applied by a surface of an object to an associated one of a plurality of height adjustable pins of a bed of nails measurement gauge operable to engage and support the surface of the object;
    (b) computing difference forces $\{\Delta F\}$ between a target force $\{F_t\}$ for each pin and the measured forces $\{F_m\}$ at each pin;
    (c) computing height changes $\{\Delta H\}$ to heights, one for each of the pins, as a function of the difference forces $\{\Delta F\}$; and
    (d) transmitting adjustment signals to adjust all of the heights of the pins as a group in accordance with the height changes $\{\Delta H\}$ to new heights.

2. The method of claim 1, further comprising repeating steps (a)-(d) until the target force $\{F_t\}$ is substantially obtained such that the new heights of the pins are indicative of a gravity free shape of the surface of the object.

3. The method of claim 1, wherein the object is a flexible substrate.

4. The method of claim 1, wherein the step of computing a matrix of new heights includes:
    determining a matrix of relationships $[\Delta f/\Delta h]$ for each pin indicative of changes in force on such pin resulting from changes in height of the other pins; and
    computing the height changes $\{\Delta H\}$ in accordance with the following matrix equation:

$\{\Delta H\} = [\Delta f/\Delta h]^{-1}\{F_t - F_m\}$.

5. The method of claim 4, wherein the matrix of relationships $[\Delta f/\Delta h]$ is obtained using linear elastic plate theory to obtain $[K] = [\Delta f/\Delta h]$.

6. The method of claim 4, wherein each of the values of the matrix $[\Delta f/\Delta h] = [CG]$ is obtained by taking a derivative of the force on a given one of the pins with respect to the height of another of the pins.

7. The method of claim 6, wherein the step of determining [CG] includes substeps:
    (a) measuring a change in load on each of the pins in response to changing a height of a given one of the pins;
    (b) computing a value of the matrix [CG] for the given pin based on the measurements in substep (a); and
    (c) repeating substeps (a)-(b) for each pin to complete the matrix [CG].

8. The method of claim 7, wherein the step of computing the height changes $\{\Delta H\}$ is obtained in accordance with the following matrix equation:

$\{\Delta H\} = [CG]^{-1}\{Ft - Fm\}$.

9. A method of measuring a gravity-free shape of a surface of an object, the method comprising:
    receiving measurement signals from a plurality of pins that are operable to support the surface during measurement, each pin including a load cell and a height adjuster, each height adjuster being operable to adjust a height of the associated pin in response to adjustment signals;
    systematically calculating pin height adjustments for each pin and producing the adjustment signals therefrom;
    sending the adjustment signals to the height adjusters, such that the heights of each pin is adjusted to cause the surface to exert on each pin a measured force nearing a target force corresponding to the gravity-free shape, and an array of pin height final values is indicative of a measurement of the gravity-free shape of the surface.

10. The method of claim 9, wherein calculating pin height adjustments includes:
    (a) calculating a target force on each pin;
    (b) determining an array $\{F_t\}$ of target forces on the pins;
    (c) calculating a matrix, [K], of force changes relative to height changes, and inverse matrix, $[K]^{-1}$;
    (d) receiving measurement signals representing a measured force on each pin;
    (e) determining an array $\{F_m\}$ of measured forces on the pins;
    (f) calculating a force difference array, $\{\Delta F\}$, from the array of measured forces and the array of target forces;
    (g) determining whether the force difference array, $\{\Delta F\}$, is within a range of acceptable differences, if the determination is in the affirmative moving to step (i), and if the determination is in the negative then moving to step (h); (h) computing an array $\{\Delta H\}$ of pin height adjustment values as a function of the force difference array $\{\Delta F\}$ and producing the pin height adjustments as adjustment signals based thereon, and beginning a new cycle of steps (d)-(g);
    (i) exiting the Fm-cycle and the pin height adjustment process, with the array $\{H\}$ of the pin height final values.

11. The method of claim 9, wherein calculating pin height adjustments includes:
    (a) calculating a target force on each pin;
    (b) determining an array $\{F_t\}$ of target forces on the pins;
    (c) transmitting a first pin height adjustment as a first adjustment signal to change a height of a first pin j;
    (d) receiving a measured force as a measurement signal for each pin;
    (e) calculating a load change for each pin;
    (f) calculating a conjugate gradient $CG_{ij}$ of each pin i with respect to the pin height adjustment to pin j;
    (g) repeating steps (c)-(f) for each pin such that a $CG_{ij}$ has been calculated for each pin, and determining a matrix [CG] of conjugate gradients based thereon;
    (h) calculating a conjugate gradient matrix inverse $[CG]^{-1}$;
    (i) receiving measurement signals representing a measured force on each pin, and determining an array $\{F_m\}$ of measured forces on the pins;
    (j) calculating a force difference array, $\{\Delta F\}$, from the array of measured forces and the array of target forces;
    (k) determining whether the force difference array, $\{\Delta F\}$, is within a range of acceptable differences, if the determination is in the affirmative moving to step (n), and if the determination is in the negative, moving to step (l);
    (l) computing an array $\{\Delta H\}$ of pin height adjustment values as a function of the force difference array $\{\Delta F\}$ and producing the pin height adjustments as adjustment signals based thereon; and
    (m) determining whether the force difference array of a current cycle of steps (i)-(k) is less than the force difference of a previous cycle of steps (i)-(k), if the determination is in the affirmative beginning a new cycle of steps (i)-(k), and if the determination is in the negative beginning a new cycle of steps (c)-(m);

(n) exiting the Fm-cycle and the pin height adjustment process, with the array {H} of the pin height final values.

12. An apparatus for measuring a shape of a surface of an object, the apparatus comprising:
a bed of nails measurement gauge having a plurality of pins that are operable to engage the surface and support the object;
at least one load cell coupled to each pin and operable to produce a load signal indicative of a force applied to the given pin by the surface;
at least one height adjuster coupled to each pin and operable to set a height of the given pin in response to a height adjustment signal; and
a processing circuit operable to compute height adjustment signals {ΔH} for all of the pins as a group, where {ΔH} is a function of a difference forces {ΔF} between a target force {$F_t$} for each pin and a measured force {$F_m$} at each pin from the load cells, and resultant new heights of the pins are indicative of a gravity free shape of the surface of the object.

13. An apparatus for measuring a gravity-free shape of a surface of an object, the apparatus comprising:
a bed of nails shape measurement gauge having a plurality of pins operable to support the surface during measurement;
a load cell disposed in each pin and operable to produce a measurement signal indicative of a force exerted on the associated pin by the surface;
a height adjuster disposed in each pin and operable to execute pin height adjustments in response to adjustment signals,
whereby execution of the pin height adjustments positions the plurality of pins so that the surface exerts a measured force on each pin that is substantially equal to a target force corresponding to the gravity-free shape, and an array of pin height final values is indicative of a measurement of the gravity-free shape of the surface.

14. The apparatus of claim 13, further comprising a processor operable to receive the measurement signals, to calculate the pin height adjustments, and to produce the adjustment signals.

15. The apparatus of claim 14, wherein the processor is operable to calculate the pin height adjustments by executing the steps, including:
(a) calculating a target force on each pin;
(b) determining an array {$F_t$} of target forces on the pins;
(c) calculating a matrix, [K], of force changes relative to height changes, and inverse matrix, $[K]^{-1}$;
(d) receiving measurement signals representing a measured force on each pin;
(e) determining an array {$F_m$} of measured forces on the pins;
(f) calculating a force difference array, {ΔF }, from the array of measured forces and the array of target forces;
(g) determining whether the force difference array, {ΔF}, is within a range of acceptable differences, if the determination is in the affirmative moving to step (i), and if the determination is in the negative moving to step (h);
(h) computing an array {☐H} of pin height adjustment values as a function of the force difference array {ΔF} and producing the pin height adjustments as adjustment signals based thereon and beginning a new cycle of steps (d)-(g);
(i) exiting the Fm-cycle and the pin height adjustment process, with the array {H} of the pin height final values.

16. The apparatus of claim 14, wherein the processor is operable to calculate the pin height adjustments by executing steps, including:
(a) calculating a target force on each pin;
(b) determining an array {$F_t$} of target forces on the pins;
(c) transmitting a first pin height adjustment as a first adjustment signal to change a height of a first pin j;
(d) receiving a measured force as a measurement signal for each pin;
(e) calculating a load change for each pin;
(f) calculating a conjugate gradient $CG_{ij}$ of each pin i with respect to the pin height adjustment to pin j;
(g) repeating steps (c)-(f) for each pin such that a $CG_{ij}$ has been calculated for each pin, and determining a matrix [CG] of conjugate gradients based thereon;
(h) calculating a conjugate gradient matrix inverse $[CG]^{-1}$;
(i) receiving measurement signals representing a measured force on each pin, and determining an array {$F_m$} of measured forces on the pins;
(j) calculating a force difference array, {ΔF}, from the array of measured forces and the array of target forces;
(k) determining whether the force difference array, {ΔF}, is within a range of acceptable differences, if the determination is in the affirmative moving to step (n), and if the determination is in the negative, moving to step(l);
(l) computing an array {☐H} of pin height final values as a function of the force difference array {ΔF} and producing the pin height adjustments as adjustment signals based thereon; and
(m) determining whether the force difference array of a current cycle of steps (i)-(k) is less than the force difference of a previous cycle of steps (i)-(k), if the determination is in the affirmative beginning a new cycle of steps (i)-(k), and if the determination is in the negative beginning a new cycle of steps (c)-(m);
(n) exiting the Fm-cycle and the pin height adjustment process, with the array {H} of the pin height final values.

17. A computerized system for measuring a gravity-free shape of a surface of an object, comprising:
a computer processor that:
(a) receives measured forces {$F_m$}, each measured force $F_m$ indicative of a force applied by a surface of an object to an associated one of a plurality of height adjustable pins of a bed of nails measurement gauge operable to engage and support the surface of the object;
(b) computes difference forces {ΔF} between a target force {$F_t$} for each pin and the measured forces {$F_m$} at each pin;
(c) computes height changes {ΔH} to heights, one for each of the pins, as a function of the difference forces {ΔF};
(d) produces adjustment signals for adjusting all of the heights of the pins as a group in accordance with the height changes {ΔH} to new heights; and
(e) sends the adjustment signals to the plurality of height adjustable pins, such that the height of each pin is adjusted.

18. The system of claim 17, wherein the computer processor repeats steps (a)-(d) until the target force {$F_t$} is substantially obtained such that the new heights of the pins are indicative of a gravity free shape of the surface of the object.

19. The system of claim 18, wherein the computer processor
Determines a matrix of relationships [Δf/Δh] for each pin indicative of changes in force on such pin resulting from changes in height of the other pins; and
Computes the height changes {ΔH} in accordance with the following matrix equation:

$$\{\Delta H\} = [\Delta f/\Delta h]^{-1}\{F_t - F_m\}.$$

20. The system of claim 19, wherein the matrix of relationships [Δf/Δh] is obtained using linear elastic plate theory to obtain [K]=[Δf/Δh].

21. The system of claim 19, wherein each of the values of the matrix [Δf/Δh]=[CG] are obtained by taking a derivative of the force on a given one of the pins with respect to the height of another of the pins.

22. The system of claim 21, wherein the computer processor executes substeps including:
   (a) measure a change in load on each of the pins in response to changing a height of a given one of the pins;
   (b) compute a value of the matrix [CG] for the given pin based on the measurements in substep (a); and
   (c) repeat substeps (a)-(b) to complete the matrix [CG].

23. The system of claim 22, wherein the computer processor computes the height changes {ΔH} in accordance with the following matrix equation:

$$\{\Delta H\}=[CG]^{-1}\{Ft-Fm\}.$$

24. The system of claim 17, further comprising:
   a measurement driver to communicate with the load cells;
   an adjustment driver to control the height adjusters; and
   a computational engine to perform calculations.

25. The system of claim 24, further comprising:
   a database;
   an input/output driver;
   a logic interface; and
   a graphical user interface.

26. The system of claim 17, wherein the computer processor calculates the pin height adjustments by executing substeps, including:
   (a) calculating a target force on each pin;
   (b) determining an array {Ft} of target forces on the pins;
   (c) calculating a matrix, [K], of force changes relative to height changes, and inverse matrix, $[K]^{-1}$;
   (d) receiving measurement signals representing a measured force on each pin;
   (e) determining an array {Fm} of measured forces on the pins;
   (f) calculating a force difference array, {ΔF}, from the array of measured forces and the array of target forces;
   (g) determining whether the force difference array, {ΔF}, is within a range of acceptable differences, if the determination is in the affirmative moving to substep (i), and if the determination is in the negative then moving to substep (h);
   (h) computing an array {□H} of pin height adjustment values as a function of the force difference array {ΔF} and producing the adjustment signals based thereon, and beginning a new cycle of substeps (d)-(g);
   (i) exiting the Fm-cycle and the pin height adjustment process, with the array {H} of the pin height final values.

27. The system of claim 17, wherein the computer processor calculates the pin height adjustments by executing substeps, including:
   (a) calculating a target force on each pin;
   (b) determining an array {Ft} of target forces on the pins;
   (c) transmitting a first pin height adjustment as a first adjustment signal to change a height of a first pin j;
   (d) receiving a measured force as a measurement signal for each pin;
   (e) calculating a load change for each pin;
   (f) calculating a conjugate gradient $CG_{ij}$ of each pin i with respect to the pin height adjustment to pin j;
   (g) repeating substeps (c)-(f) for each pin such that a $CG_{ij}$ has been calculated for each pin, and determining a matrix [CG] of conjugate gradients based thereon;
   (h) calculating a conjugate gradient matrix inverse $[CG]^{-1}$;
   (i) receiving measurement signals representing a measured force on each pin, and determining an array {$F_m$} of measured forces on the pins;
   (j) calculating a force difference array, {ΔF}, from the array of measured forces and the array of target forces;
   (k) determining whether the force difference array, {ΔF}, is within a range of acceptable differences, if the determination is in the affirmative moving to substep (n), and if the determination is in the negative moving to substep (l);
   (l) computing an array {□H} of pin height final values as a function of the force difference array {ΔF} and producing the adjustment signals based thereon;
   (m) determining whether the force difference array of a current cycle of substeps (i)-(k) is less than the force difference of a previous cycle of substeps (i)-(k), if the determination is in the affirmative beginning a new cycle of substeps (i)-(k), and if the determination is in the negative beginning a new cycle of substeps (c)-(m);
   (n) exiting the Fm-cycle and the pin height adjustment process, with the array {H} of the pin height final values.

28. A storage medium containing computer executable instructions operable to cause a processor to execute actions, comprising:
   (a) receiving measured forces {$F_m$}, each measured force $F_m$ indicative of a force applied by a surface of an object to an associated one of a plurality of height adjustable pins of a bed of nails measurement gauge operable to engage and support the surface of the object;
   (b) computing difference forces {ΔF} between a target force {$F_t$} for each pin and the measured forces {$F_m$} at each pin;
   (c) computing height changes {ΔH} to heights, one for each of the pins, as a function of the difference forces {ΔF}; and
   (d) producing adjustment signals for adjusting all of the heights of the pins as a group in accordance with the height changes {ΔH} to new heights.

29. The storage medium of claim 28, wherein the computer executable instructions are further operable to cause the processor to execute actions, comprising: repeating steps (a)-(d) until the target force {$F_t$} is substantially obtained such that the new heights of the pins are indicative of a gravity free shape of the surface of the object.

30. The storage medium of claim 29, wherein the step of computing a matrix of new heights includes:
   determining a matrix of relationships [Δf/Δh] for each pin indicative of changes in force on such pin resulting from changes in height of the other pins; and
   computing the height changes {ΔH} in accordance with the following matrix equation:

$$\{\Delta H\}=[\Delta f/\Delta h]^{-1}\{F_t-F_m\}.$$

31. The storage medium of claim 30, wherein the matrix of relationships [Δf/Δh] is obtained using linear elastic plate theory to obtain [K]=[Δf/Δh].

32. The storage medium of claim 30, wherein each of the values of the matrix [Δf/Δh]=[CG] is obtained by taking a derivative of the force on a given one of the pins with respect to the height of another of the pins.

33. The storage medium of claim 32, wherein the step of determining [CG] includes substeps:
   (a) measuring a change in load on each of the pins in response to changing a height of a given one of the pins;
   (b) computing a value of the matrix [CG] for the given pin based on the measurements in substep (a); and
   (c) repeating substeps (a)-(b) to complete the matrix [CG].

34. The storage medium of claim 33, wherein the step of computing the height changes {ΔH} is obtained in accordance with the following matrix equation:

$$\{\Delta H\} = [CG]^{-1}\{Ft - Fm\}.$$

35. The storage medium of claim 28, wherein the computer executable instructions are operable to cause the processor to calculate the pin height adjustments by executing substeps, including:
 (a) calculating a target force on each pin;
 (b) determining an array $\{F_t\}$ of target forces on the pins;
 (c) calculating a matrix, [K], of force changes relative to height changes, and inverse matrix, $[K]^{-1}$;
 (d) receiving measurement signals representing a measured force on each pin;
 (e) determining an array $\{F_m\}$ of measured forces on the pins;
 (f) calculating a force difference array, {ΔF}, from the array of measured forces and the array of target forces;
 (g) determining whether the force difference array, {ΔF}, is within a range of acceptable differences, if the determination is in the affirmative moving to substep (i), and if the determination is in the negative moving to substep (h);
 (h) computing an array {☐H} of pin height final values as a function of the force difference array {ΔF} and producing the adjustment signals based thereon, and beginning a new cycle of substeps (d)-(g);
 (i) exiting the Fm-cycle and the pin height adjustment process, with the array {H} of the pin height final values.

36. The system of claim 28, wherein the computer executable instructions are operable to cause the processor to calculate the pin height adjustments by executing substeps, including:
 (a) calculating a target force on each pin;
 (b) determining an array $\{F_t\}$ of target forces on the pins;
 (c) transmitting a first pin height adjustment as a first adjustment signal to change a height of a first pin j;
 (d) receiving a measured force as a measurement signal for each pin;
 (e) calculating a load change for each pin;
 (f) calculating a conjugate gradient $CG_{ij}$ of each pin i with respect to the pin height adjustment to pin j;
 (g) repeating substeps (c)-(f) for each pin such that a $CG_{ij}$ has been calculated for each pin, and determining a matrix [CG] of conjugate gradients based thereon;
 (h) calculating a conjugate gradient matrix inverse $[CG]^{-1}$;
 (i) receiving measurement signals representing a measured force on each pin, and determining an array $\{F_m\}$ of measured forces on the pins;
 (j) calculating a force difference array, {ΔF}, from the array of measured forces and the array of target forces;
 (k) determining whether the force difference array, {ΔF}, is within a range of acceptable differences, if the determination is in the affirmative moving to substep (n); and if the determination is in the negative, moving to substep (l);
 (l) computing an array {☐H} of pin height final values as a function of the force difference array {ΔF} and producing the adjustment signals based thereon; and
 (m) determining whether the force difference array of a current cycle of substeps (i)-(k) is less than the force difference of a previous cycle of substeps (i)-(k), if the determination is in the affirmative beginning a new cycle of substeps (i)-(k), and if the determination is in the negative beginning a new cycle of substeps (c)-(m);
 (n) exiting the Fm-cycle and the pin height adjustment process, with the array {H} of the pin height final values.

* * * * *